United States Patent
Myles et al.

(10) Patent No.: US 7,184,407 B1
(45) Date of Patent: Feb. 27, 2007

(54) DETECTING, REPORTING AND MITIGATING HIDDEN NODES IN A WIRELESS DATA NETWORK

(75) Inventors: Andrew F. Myles, St. Ives (AU); Alex C. K. Lam, Chatswood (AU); David S. Goodall, Randwick (AU)

(73) Assignee: Cisco Systems Wireless Networking (Australia) Pty Limited, North Sydney (AU)

(*) Notice: Subject to any disclaimer, the term of this patent is extended or adjusted under 35 U.S.C. 154(b) by 1042 days.

(21) Appl. No.: 10/142,538

(22) Filed: May 10, 2002

(51) Int. Cl.
*G01R 31/08* (2006.01)
(52) U.S. Cl. .................................................. 370/242
(58) Field of Classification Search .................... None
See application file for complete search history.

(56) References Cited

U.S. PATENT DOCUMENTS

| | | | |
|---|---|---|---|
| 6,996,074 B2* | 2/2006 | Garcia-Luna-Aceves et al. | 370/278 |
| 2003/0174680 A1* | 9/2003 | Kuan et al. | 370/338 |
| 2004/0047324 A1* | 3/2004 | Diener | 370/338 |
| 2004/0141522 A1* | 7/2004 | Texerman et al. | 370/466 |

OTHER PUBLICATIONS

Cupid Chow and V.C.M. Leung, "Performance of IEEE 802.11 MAC Protocol over a wireless LAN with distributed radio bridges", Proceedings of the IEEE Wireless Communications and Networking Conference (WCNC'99), New Orleans, LA, Sep. 21-24, 1999.

Khurana, S.; Kahol, A.; Gupta, S.K.S.; Srimani, P.K.: Performance evaluation of distributed co-ordination function for IEEE 802.11 wireless LAN protocol in presence of mobile and hidden terminals Proceedings. 7th International Symposium on Modeling, Analysis and Simulation of Computer and Telecommunication Systems 1999., MASCOTS'99), pp. 40-47.

Khurana, S.; Kahol, A.; Jayasumana, A.P. Effect of hidden terminals on the performance of IEEE 802.11 MAC protocol, Proceedings, 23rd Annual Conference on Local Computer Networks, 1998. LCN '98., 1998, pp. 12-20.

\* cited by examiner

*Primary Examiner*—Doris H. To
*Assistant Examiner*—Thien D. Tran
(74) *Attorney, Agent, or Firm*—Dov Rosenfeld; Inventek

(57) ABSTRACT

A method for automatic hidden node detection that includes observing frame exchange sequences that conform to a MAC standard such as the IEEE 802.11 standard. The method includes detecting a hidden node upon receiving a response frame without previously receiving the frame causing the response. Similar conclusions may be drawn from longer frame sequences. When a hidden node has been detected with reasonable certainty, a hidden node report is sent to a hidden node manager. In one embodiment, the hidden node manager is centralized, and in another, the management function is performed in a distributed manner. Upon receiving a report, the hidden node manager automatically invokes hidden node avoidance measures by sending one or more action frames. In another embodiment, the hidden node manager turns on a hidden node mitigation method. In the case of the IEEE 802.11 standard, the hidden node manager turns on the IEEE 802.11 hidden node mitigation method based on RTS/CTS exchange.

17 Claims, 5 Drawing Sheets

DETECTING, REPORTING AND MITIGATING HIDDEN NODES IN A WIRELESS DATA NETWORK

BACKGROUND

The present invention is related to wireless communication, and in particular to a method and apparatus for detecting, reporting, and either avoiding or mitigating hidden nodes in a wireless data communication network.

Wireless communication networks are already in common use and will become more so as new standards emerge and systems become more widely deployed. One application of wireless networks is data networks such as local area networks. The IEEE 802.11 is a popular standard for wireless local area networks (WLANs). Variations include the IEEE 802.11b standard for communications in the 2.4 GHz range for transmission rates to about 11 Mbps (megabits per second), now popularly called "WiFi", the IEEE 802.11a standard for communications in the 5 GHz range for transmission rates to about 54 Mbps or more, now popularly called "WiFi-5," and the IEEE 802.11g proposed standard for communications in the 2.4 GHz range at up to 54 Mbps.

The description herein is in terms of networks that conform to the 802.11 standard. The invention, however, is not restricted to such wireless communication networks.

A Basic Service Set (BSS) consists of two or more wireless nodes, also called stations (STAs), which have recognized each other and have established communications. In the most basic form, stations communicate directly with each other on a peer-to-peer basis, sharing a given cell coverage area. This type of network is often formed on a temporary basis, and is commonly referred to as an ad hoc network or Independent Basic Service Set (IBSS).

In most instances, the BSS contains a node that acts as an Access Point (AP). The main function of an AP is to form a bridge between wireless and wired LANs. The AP is analogous to a base station used in cellular phone networks. An AP can also work as a repeater. When an AP is present, the stations do not normally communicate on a peer-to-peer basis. Usually all communications between stations or between a station and a wired network client go through the AP. APs are typically not mobile and typically form part of the wired network infrastructure. A BSS in this configuration is said to be operating in the infrastructure mode. The term BSS shall refer to such an infrastructure network, while the term IBSS shall be used for an ad hoc configuration.

A station or node is a hidden node to a second node if that node—the first node—cannot be "heard" at the second node, and transmissions from the first node can collide with those from the second node at some third node. The first node may be hidden because of some physical barrier in the path to the second node, for example a thick wall, or because the second node is far away.

The existence of one or more hidden nodes in a wireless network may reduce the performance in the network. This is particularly so for large deployments that include many nodes. Consider for example a network conforming to the IEEE 802.11 standard. The MAC protocol for the IEEE 802.11 standard uses a carrier sense multiple access with collision avoidance (CSMA/CA) protocol to provide basic access to the medium and a virtual carrier sense mechanism to improve the basic access mechanism. The CSMA/CA protocol relies on the energy from every node to be received at every other node, while the virtual carrier sense mechanism relies on MAC frames from every node to be received at every other node. The presence of one or more hidden nodes means energy and MAC frames are not received at every other node. This increases the probability of collisions, which in turn wastes bandwidth. This waste becomes larger the more nodes there are in the network and the more hidden nodes that may exist in the network. See, for example, Sumit Khurana, Anurag Kahol and Anura P. Jayasumana, "Effect of Hidden Terminals on the Performance of IEEE 802.11 MAC Protocol," *Proceedings of the 23rd. IEEE Annual Conference on Local Computer Networks*, IEEE, 1998.

Thus, there is a need in the art for a method to detect and report the presence of hidden nodes. There also is a need in the art for a method to mitigate or avoid hidden nodes.

Known methods for dealing with hidden nodes in the IEEE 802.11 standard provide only for mitigating the effects of hidden nodes. For example, the IEEE 802.11 MAC specification provides for optionally using a short frame called a "request to transmit" (RTS) and waiting for a short response frame called a "clear to send" (CTS) for the purpose of mitigating the effects of hidden nodes. If every node in the network uses RTS/CTS, collisions are guaranteed to occur only for short RTS frames and not potentially long DATA frames. When RTS/CTS is used, RTS/CTS thresholds must be set on both APs and STAs. Thus, a user must manually detect or deduce the presence of hidden node(s) and if desired, manually turn on the hidden node mitigation technique, for example by enforcing the use of RTS/CTS by lowering the RTS/CTS trigger threshold. However, enforcing the use of RTS/CTS may lower the overall system throughout because of the overhead for the extra frame exchange. Thus, it would be advantageous to avoid the hidden node problem altogether. Furthermore, the IEEE 802.11 standard provides no mechanism for automatically detecting and reporting the presence of the hidden nodes, and there clearly would be an advantage in so automatically detecting and reporting the presence of the hidden nodes in a network conforming to the IEEE 802.11 standard. Once the hidden nodes are reported, the appropriate mitigating or avoiding action may be taken.

SUMMARY

One aspect of the invention includes a method for automatic hidden node detection that includes observing frame exchange sequences that conform to a MAC standard—the IEEE 802.11 standard in one embodiment. In one embodiment, receiving a response frame, e.g., ACK or a CTS, without the frame causing the response (the "response-causing frame"), indicates a hidden node. Similar conclusions may be drawn from longer frame sequences.

Some hidden node detections occur with certainty while others with less certainty. One hidden node detector embodiment compiles data on hidden node detections to increase the level of certainty that a suspected hidden node is hidden. Once a settable level of certainty has been reached that the suspected hidden node is hidden, or in another embodiment upon receipt of a request for a report, a hidden node report is sent to a hidden node manager. In one embodiment the hidden node manager is centralized. In another embodiment, the management function is performed in a distributed manner, for example, by a set of stations that each include a hidden node manager in the form of a computer program. Upon receiving a report, the hidden node manager automatically invokes hidden node avoidance measures by sending one or more action frames. In another embodiment, the hidden node manager turns on a hidden node mitigation method. In the case of the IEEE 802.11 standard, the hidden node manager turns on the IEEE 802.11 hidden node mitigation method based on RTS/CTS exchange.

DETAILED DESCRIPTION

Figure 1A:
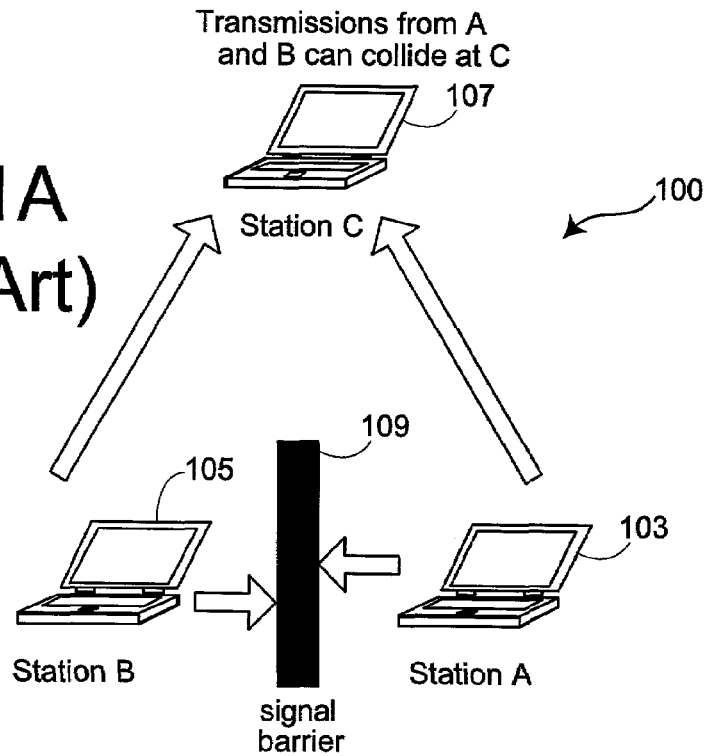
FIGS. 1A and 1B each shows a situation in which the hidden node problem may occur.
Figure 1B:
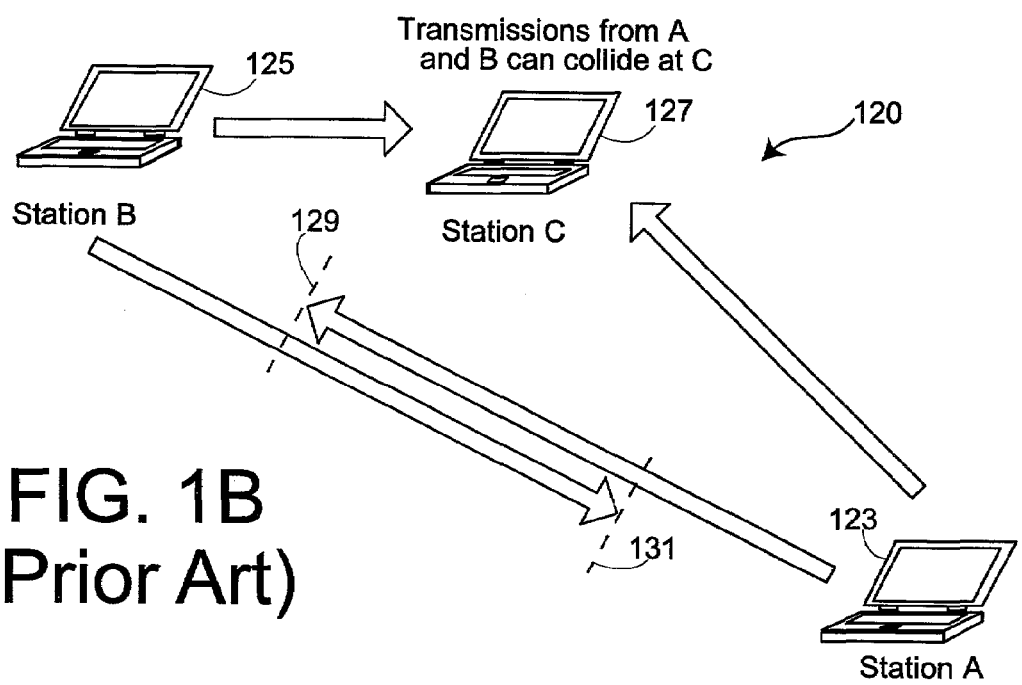

The invention is described in the context of an IEEE 802.11 wireless local area network. FIGS. 1A and 1B each show a network 100 in which the hidden node problem may occur. The network 100 includes three stations, A, B, and C shown as having reference numerals 103, 105, and 107, respectively. In FIG. 1A, a physical barrier 109 exists between station A and station B that prevents transmissions from station A 103 to be heard by station B 105. The physical barrier may be, for example, a wall in a building. Station C 107 can hear both stations A and B. Furthermore, transmissions from station A 103 can collide with those from station B 105 at station C 107. Station A 103 is a hidden node. FIG. 1B shows another network 120 that includes three stations A, B, and C having reference numerals 123, 125, and 127, respectively. Station A cannot be heard by station B because, in this case, station A it too far away from station B. The range of station A's transmissions in the direction of station B is shown as 129. Again transmissions from station A can collide with those from station B at station C 127. Note that in this particular example, transmissions from station B in the direction of station A also are limited to a range 131.

Figure 2:
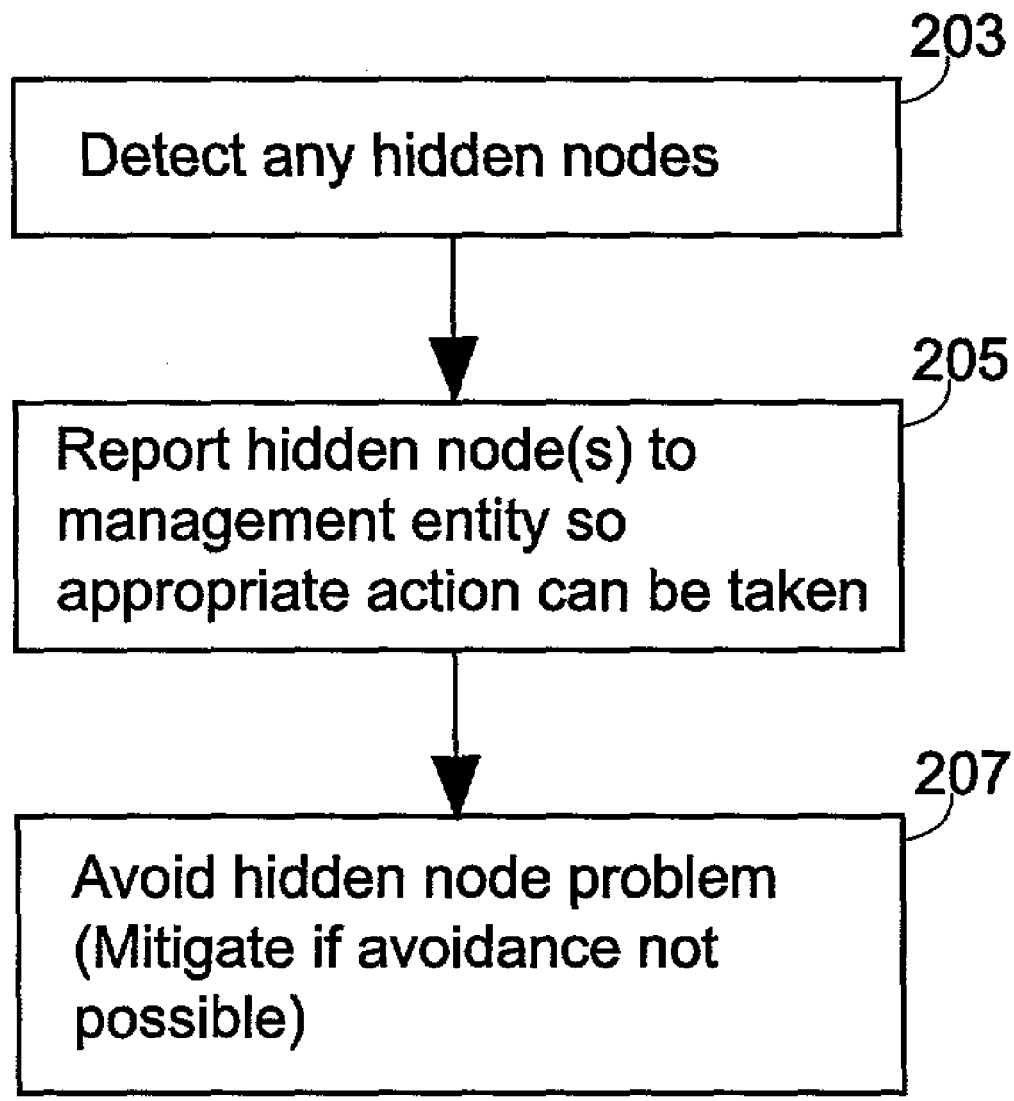
FIG. 2 shows an overview of a method embodiment of the invention.

FIG. 2 shows an overview of method embodiments of the invention. In a step 203, hidden nodes are identified so that they can be mitigated or avoided. This is described in more detail below. First, a useful definition of what "hidden node" means. To define hidden node includes defining what is meant by one station "hearing" or not "hearing" another station. Therefore, one aspect of the invention is identifying one or more appropriate definitions of "hearing" in the context of hidden node detection. With such definitions identified, described below is at least one method of carrying out step 203 of identifying the hidden nodes.

In a step 205, the identified hidden nodes are reported to a management entity so that appropriate action can be taken. In one embodiment, the management entity is a centralized entity, and in another embodiment, the management function is carried out on a distributed basis.

In one embodiment, in a step 207, the hidden nodes are avoided. In an alternate embodiment, applicable to when avoidance of a station is not possible or desirable, the hidden node problem is at least mitigated (alternate step 207). One version automates the use of the existing IEEE 802.11 hidden node mitigation method based on RTS/CTS exchanges.

Defining Hearing for the Purpose of Hidden Node Detection

A definition of hearing is desired. Many definitions of hearing may be used according to the amount of information successfully received or not from the other station. For example, one may define the state of station B hearing station A if station B successfully receives the transmission carrier transmitted by station A. A station includes receive hardware that asserts a clear channel assessment (CCA) just after energy is received that might indicate reception of data from another station, and such a CCA assertion may be used to define when a station hears another station. However, because it is possible that a CCA signal may have been triggered by random noise, and further because the CCA is asserted before the Physical Layer Convergence Protocol (PLCP) header has been decoded, the listening station may not be able to identify or accurately deduce the identity of the transmitter of the information, the inventors have decided on defining "hearing" only when more information is successfully received. Alternatively, one may define station B hearing station A if station B receives the transmission carrier, e.g., as indicated by a CCA signal asserted, and also the correct physical layer protocol header—the Physical Layer Convergence Protocol (PLCP) header in IEEE 802.11—transmitted by station A. Because the PCLP header may be protected against errors, successful decoding of this header reduces the chance that the CCA was triggered by noise. Furthermore, the "Length" field of the received PLCP header may be checked against any expected frame type, e.g., ACK frames are known to be 19 octets long. Furthermore, if the frame is part of certain frame exchange sequences, the identity of the transmitter may be deduced from an address in the immediately previous frame in the sequence, or any recently received frame in the sequence.

As yet another alternative, one may define station B hearing station A if station B successfully detects the transmission carrier, e.g., using the station's CCA logic, and further if the associated PLCP header and MAC frame are decoded and determined to be correct. In this case, again, the CCA is unlikely to have been triggered by random noise in the medium. The identity of the transmitter c an be discovered directly from the source address field in the MAC frame. However, using this definition requires both PLCP header processing and MAC frame checksum validation.

For the purposes of hidden node detection, the inventors decided to use the definition of hearing when there is successful reception of the transmission carrier and a correct PLCP header. This balances accuracy against the processing requirements.

Note that while a station may be detected as not being heard by another station according to the above definition, because there are different levels of "not being heard," a station not heard according to one definition may still cause interference. For example, a station may successfully detect the transmission carrier from a second station but still not "hear" the station according to the selected definition of hearing. The carrier detection may still cause interference problems.

Identifying Hidden Nodes

Hidden nodes must be identified before they are mitigated or avoided. In particular, it is desired to detect hidden nodes continuously in order to handle the dynamic nature of the wireless environment. Mobile stations may move, the physical environment typically changes over time, and radio conditions may change over time.

One embodiment is a method of automatically detecting in a station the presence of a hidden node by detecting an incomplete frame exchange sequence according to the MAC protocol to which the network conforms. This can be used by a station to detect hidden nodes in its own BSS or IBSS and in other BSSs or IBSSs. The term basic service set is used herein to mean an infrastructure BSS and an IBSS, unless the context makes clear that it is one or the other.

The IEEE 802.11 MAC specifies a set of frame exchange sequences. For example, there are some response-causing frames that lead to matching response frames. Such a response frame is never sent without a preceding response-causing frame first being sent. For example, a station receiving a unicast DATA frame must respond with a positive acknowledgement frame (an ACK frame) after a short interframe space (SIFS). Similarly a station receiving an RTS must respond with a CTS after a short interframe space (SIFS). An RTS/CTS frame exchange must be followed by at least one DATA/ACK exchange.

Figure 3A:
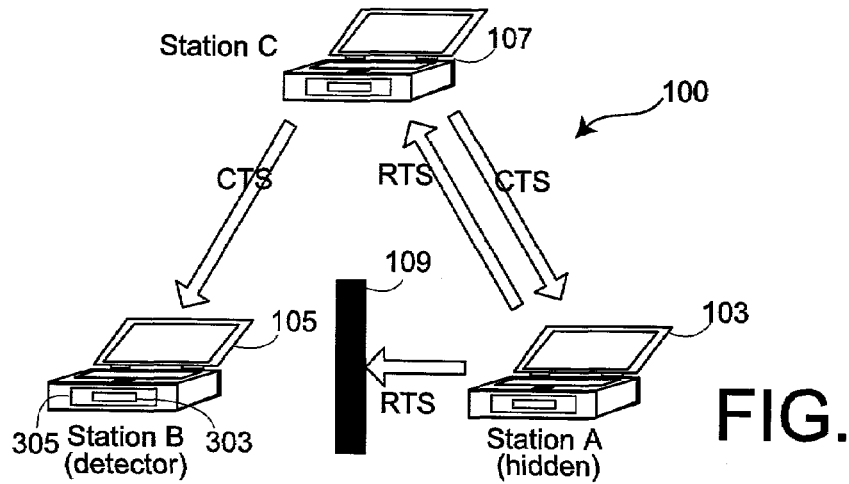
FIGS. 3A, 3B, 3C, and 3D each shows a simple wireless network and a different incomplete frame sequence that suggests the presence of a hidden node.

In one aspect of the invention, detecting incomplete sequences provides for automatic hidden station detection. Thus, receiving a response frame (ACK or CTS), without the frame causing the response, guarantees a hidden node. FIG. 3A shows a simple illustrative example of a hidden node detector detecting an incomplete frame sequence. It is envisaged that most stations in a network would include an embodiment of a hidden node detector. Station B 105 thus includes an embodiment of a hidden node detector 303. One embodiment 303 is a computer program stored in storage—e.g., a hard disk 305—in station B that executes on a processor in the station to implement the hidden node detection method. Station A 103 is hidden from station B 105 by a barrier 109. Station A sends a RTS which is received by station C 107 but not by station B. Station C responds to the RTS by sending a CTS. The CTS is received in station A and in station B. Because station B did not receive the response-causing frame to the CTS response frame, the hidden node detector in station B automatically detects that there must be a hidden station. Hidden node detector 303 similarly automatically detects the presence of a hidden node when an ACK frame is received without the preceding response-causing frame—a DATA frame—having been received.

Figure 3B:
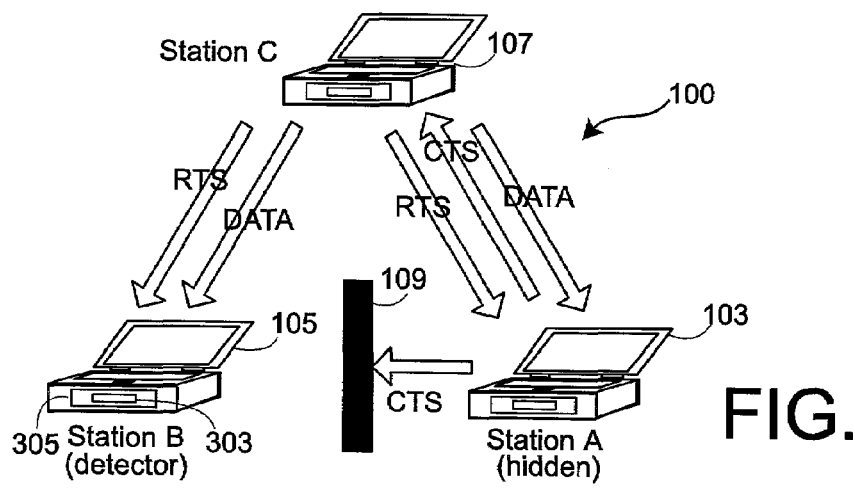

FIG. 3B illustrates a simple example of automatically detecting the presence of a hidden node by receiving more than one response-causing frames in sequence from the same frame exchange without receiving one of the required matching response frames. In the longer IEEE 802.11 frame exchange sequences, there may be more than one frame that requires a response, i.e., more than one response-causing frame. An RTS/CTS frame exchange, for example, must be followed by at least one DATA/ACK exchange. In FIG. 3B, Station C 107 sends an RTS in order to send data. Both station A 103 and station B 105 receive the RTS frame. Suppose at some time, station A responds with a CTS. Station C receives the CTS and then follows with a DATA frame which solicits an ACK response. Station B does not receive the CTS (station A is hidden from B) but does receive the DATA frame immediately following the RTS frame. Thus, station B has received two sequential frames—RTS and DATA, both response-causing frames, without receiving the intervening CTS frame. The hidden node detector 303 in station B determines whether or not the frames it receives are part of the same sequence. In one embodiment, the hidden node detector in station B determines whether frames are of the same sequence using the timestamp information that can be associated with received MAC frames.

Similarly, when station B receives fragments of DATA within a fragment chain, without the ACK frames in between, the hidden node detector detects the presence of a hidden node.

Figure 3C:
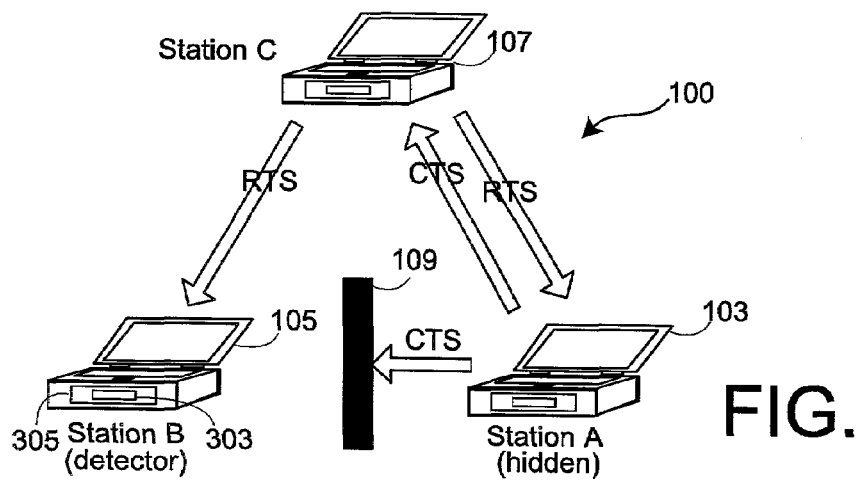
Figure 3D:
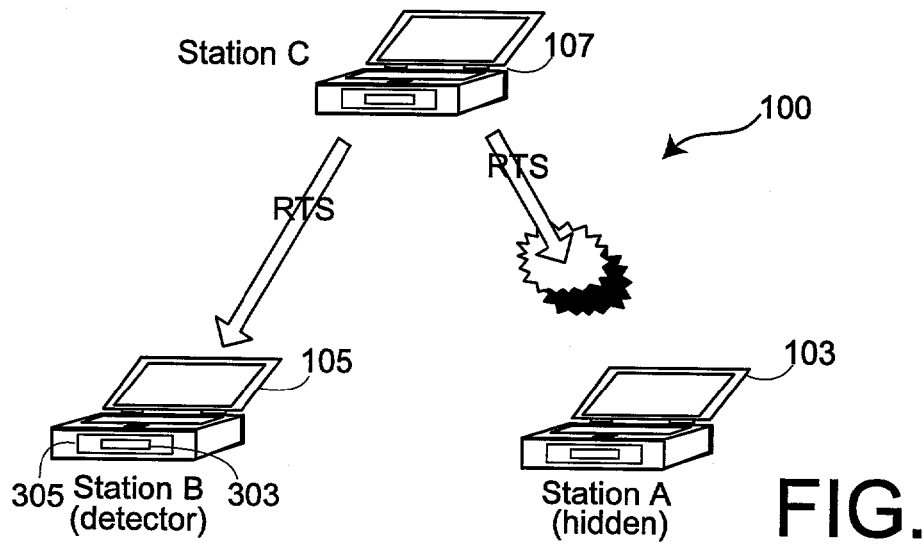

Another method of detecting a hidden station includes a station receiving a single response-causing frame but not receiving the matching response frame. This provides evidence for the presence of a hidden node, but is not conclusive. FIG. 3C shows a simple example of station C 107 transmitting a response-causing frame, e.g., a RTS. Station A 103 and station B 105 receive the RTS frame and station A responds with a CTS. Station B in such a case receives the RTS, but not the CTS from station A because a barrier 109 hides station A. Thus, the hidden node detector in station B may suspect that there is a hidden node. Note however that frames can be lost due to a bad link, or a destination station may leave the BSS or IBSS and not be able to respond. Consider for example the case shown in FIG. 3D, which is similar to the situation of FIG. 3C, but suppose that station A 103 never receives the original RTS from station C 107. Station B 105 again receives a single RTS without the CTS—exactly the same as before. However, in this case, station A is not hidden from station B. Thus, only evidence is provided.

The IEEE 802.11 protocol MAC frames provide, in a frame control part, a retry bit that indicates that the data or data fragment is a retransmission of a previously transmitted fragment so that a receiver can recognize duplicate transmissions of frames. In an improved embodiment, the hidden node detector in station B checks the retry bit in the response-causing frame. If the retry bit is set, the link is probably not reliable and the lack of response is not used to infer the presence of a possible hidden node.

One aspect of the hidden node detection method is also identifying the identity of the suspected hidden node. In one embodiment, the hidden node detector 303 obtains the hidden node's MAC address from a frame of a frame sequence that is received at the station of the hidden node detector. The hidden node's MAC address, may be obtained, for example, from the destination address in a response frame. The address may alternately be obtained from a previous frame of the sequence.

Not all detected hidden nodes are really hidden nodes. In one embodiment, the hidden node detector, typically implemented in each station maintains a table of hidden node statistics. The table includes information on each suspected hidden node. The information on hidden node entry includes the suspected hidden node's MAC address, the number of incomplete frame transactions, and the timestamps of any incomplete frame transactions. The number of incomplete frame transactions provides confidence that the suspected hidden node really is hidden.

In a step 205, the hidden node detector send a hidden node report on the detected or suspected hidden nodes to a management entity (a "hidden node manager") so that appropriate actions can be taken. In the case that the hidden node method compiles data on the suspected hidden nodes, the sending of the hidden node report occurs when or after a settable level of certainty that the suspected hidden node is hidden is achieved. In another embodiment, the compiled hidden node statistics are sent in the hidden node report, and the hidden node manager determines if a sufficient level of certainty has been achieved to take action.

Figure 5:
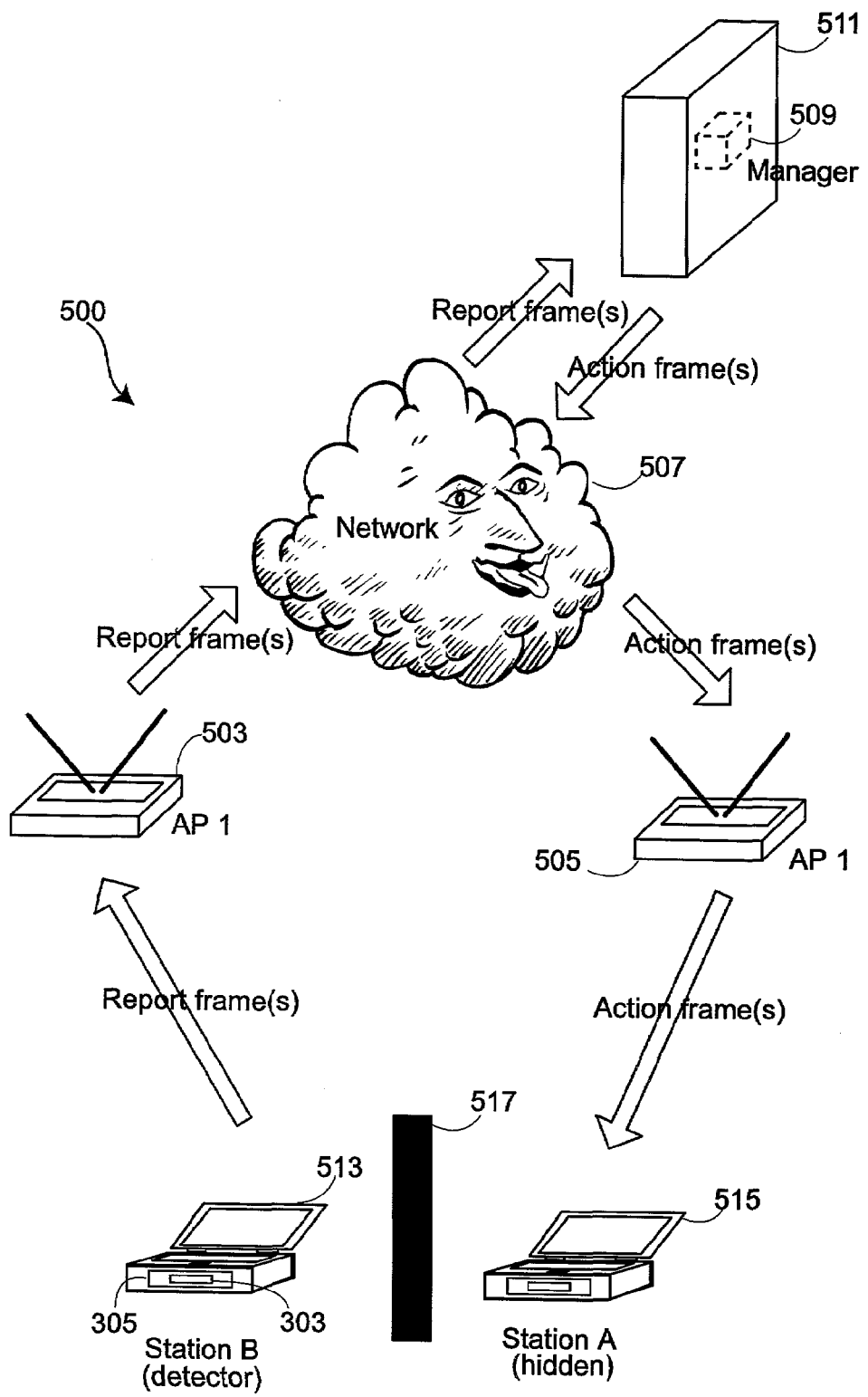
FIG. 5 shows a simple network that uses centralized hidden node management according to an embodiment of the invention.

The hidden node management function in one embodiment is centralized and in another embodiment is distributed. In the centralized management embodiment, the hidden node manager—in the form of a software program in one embodiment—receives hidden node reports from stations that act as hidden node detectors, decides what action to take, and sends out appropriate requests to take such action. In one implementation, the hidden node manager program may reside and execute in an access point. In another implementation, the hidden node manager program may reside and execute in a switch or router on the network backbone. Other configurations also are possible. A centralized manager provides for managing the control of hidden nodes from other BSSs that have a common hidden node manager. FIG. 5 shows one example of centralized hidden node management. The hidden management function is implemented in a computer program 509 called the hidden node manager that is resident on a processing system 511. Processing system 511 is coupled to a network 507. The network 507 may be a public network such as the Internet, or an intranet, or a company's extranet, and so forth. The processing system 511, for example, may be part of a switch or a router or a server system. Two BSSs having access points 503 and 505, respectively, are also coupled to the network 507. Station 515, in communication with the access point 505 is hidden from station 513, in this example via a barrier 517. The station 513 is in communication with the access point 503. Station 513 detects suspicious hidden node activity and compiles statistics. The station 513 sends out a hidden node report (one or more hidden node report frames) to the manager 509. Communication of the hidden node report frame(s) is via access point 503 and the network 507. The manager determines the course of action (see below) and sends out one or more hidden node action frames. Communication of the hidden node action frame(s) to the station 513, for example, is via the network 507 and the access point 503.

Figure 4:
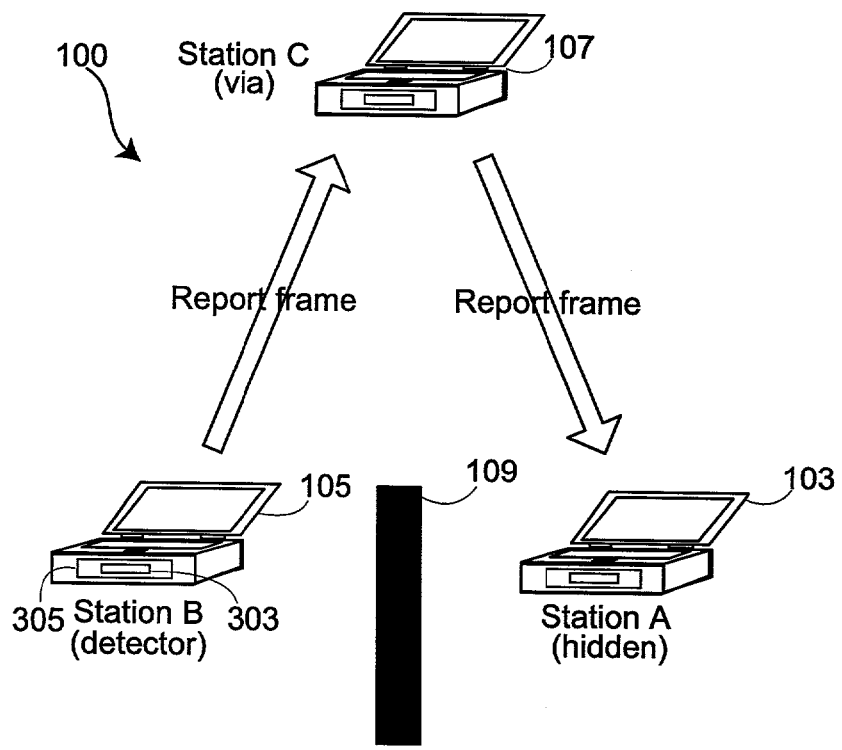
FIG. 4 shows a simple network that uses distributed hidden node management according to an embodiment of the invention.

FIG. 4 shows a simple network that uses a distributed hidden node management method. A third-party, in this case station C (107) acts as a 'via' station to convey a hidden node report from the station 105 that detects a possible hidden node situation to station A (103), the possible hidden node. For distributed management, the station selected as the via station, needs to be able to communicate with both the hidden node detector and the hidden node. According to such a method, each station includes management software that when operating determines how to handle each incoming report. The distributed manager determines if its station can communicate with both the detector from which it receives the report and the suspected hidden node detected by the detector. Distributed management can manage hidden nodes in the same BSS or IBSS. Handling of hidden nodes from other BSSs may not be possible.

It is desirable that a station detecting suspected hidden nodes should not report another station's hidden state without a high degree of certainty. Hidden node reports are normally generated when a station undergoes a change of hidden state.

It is further desirable to send hidden node reports in a controlled manner to avoid flooding. One aspect of the invention is including an adaptive method to limit the rate of sending hidden node reports. One embodiment uses exponential backoff. That is, the interval between packet retransmission is increased by a multiple, two in one embodiment.

One embodiment of the reporting uses autonomous reporting. The hidden station detector sends a hidden node report when a station is determined to be hidden. In one embodiment, the hidden node report is sent immediately upon the hidden node being detected. In another embodiment, the hidden report is sent only after a selected level of certainty is achieved. Referring to the previous described partial sequences, in such an embodiment, in the case that the hidden node detector is certain of the hidden status of a node, the hidden station report is sent. If the detection leads to a suspected hidden station, then the hidden node detector sends the report only after a selected number of detections of the same hidden node is achieved with the retry bit not set.

Autonomous reporting is applicable to both distributed and centralized hidden node management schemes. Another embodiment uses requests/response reporting and is applicable to a centralized hidden node manager. The centralized hidden node manager sends a request for a hidden node report. The frequency of sending the request is settable. The frequency is set according to how quickly hidden node mitigation or avoidance needs to be performed. One method uses a broadcast, and another method sends to selected stations according to a criterion. One criterion is to send the request only to stations that have a history of recent previous detections.

Upon receiving the request, a station sends its hidden node report to the hidden node manager. One disadvantage of the request/response method is that a station may be detecting many hidden nodes but is unable to report the situation, and thus the situation remains unresolved, e.g., unmitigated or unavoided.

Once the hidden node manager receives a hidden node report, the hidden node problem should at least be mitigated to reduce the impact on system performance. Thus, one hidden node manager embodiment acts to mitigate the hidden node problem. The mitigation action forces stations to reserve the medium prior to the actual data transfer. This may reduce collisions caused by hidden nodes. Another hidden node manager embodiment acts to avoid the hidden node problem by sending action messages to suspected hidden nodes. Another hidden node manager embodiment acts to attempt avoiding and is it is determined that avoiding is not possible, acts to mitigate the hidden node problem.

The IEEE 802.11 MAC protocol provides the RTS/CTS frame exchange sequence for the purpose of mitigating. To enforce the use of RTS/CTS frame exchange, the hidden node manager lowers the RTS/CTS trigger threshold.

The use of RTS/CTS may lower the overall system throughput due to the extra frame exchange overhead. It is thus desirable for the hidden node manager to act to avoid the hidden node problem.

Different embodiments use one or more of a set of actions that contribute to avoiding the hidden node problem. One group of actions of the set includes one or more actions that cause the transmit power of the detected hidden nodes to change. Another group of actions of the set includes one or more actions that cause changing of the channels that the detected hidden nodes use for transmitting.

One hidden node manager embodiment sends one or more types of action messages that cause the hidden nodes to adjust transmit power. Therefore, upon receiving a report of a suspected hidden node, the manager transmits an action message of one or more action frames to the suspected hidden node. The action frames are encoded such that upon receiving an action message from a hidden node manager, a station increases the power it uses for transmitting if such power is not already at a maximum. This increases the likelihood of a hidden node's messages being received. If the hidden node detection is of a station in a different BSS, an alternate hidden node action message is for the nodes in the different BSS to decrease their transmit power while maintaining their required links. This avoids the different BSSs transmissions interfering with any transmissions in this BSS. Referring to FIG. 5, the suspected hidden node is station A detected at station B. One action is to instruct station A to decrease its transmit power so that station A's transmissions won't interfere in stations B's BSS, and another action is to instruct station A to increase its transmit power sufficiently so that station B can properly receive station A's transmissions.

One hidden node manager embodiment further sends one or more types of action messages that cause one or more stations to change its radio channels. One channel changing action sends an action message to all stations in the BSS of a hidden node to switch to a new channel with the assumption that the new channel is "clearer." More than one type of channel action is included. There may not be clear channels available. Furthermore, it is not desirable to cause such "total" channel switching too often because such an action causes disruption on the network. Another action message is instructing only those stations causing hidden node problems to transfer to a different channel to eliminate the potential interference such stations may cause.

The hidden node detector in one embodiment is a computer program that executes on a processing system, e.g., of stations in the wireless network. Furthermore, the hidden node manager in one embodiment is a computer program that executes one a processing system, e.g., of a network station in one embodiment, and of a router or server or switch or other node some network in another embodiment. Thus, as will be appreciated by those skilled in the art, embodiments of the present invention may be embodied as a method, an apparatus such as a special purpose apparatus, an apparatus such as a data processing system, or a carrier medium, e.g., a computer program product, carrier medium carrying one or more computer readable code segments for controlling a processing system to carry out a set of steps. Accordingly, the present invention may take the form of an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer readable medium may be used including a magnetic storage device such as a diskette or a hard disk, or an optical storage device such as a CD-ROM.

It will be understood that the steps of methods discussed are performed in one embodiment by an appropriate one or more processor of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

The instructions (e.g., computer readable code segments in storage) may be read from storage into memory. Execution of sequences of instructions contained in memory causes one or more processor to perform the process steps described herein. In alternative embodiments, hard-wired circuitry may be used in place of or in combination with software instructions to implement the invention. Thus, embodiments of the invention are not limited to any specific combination of hardware circuitry and software.

The terms "carrier medium" and "computer-readable medium" as used herein refer to any medium that participates in providing instructions to a processor for execution. Such a medium may take many forms, including but not limited to, non-volatile media, volatile media, and transmission media. Non-volatile media includes, for example, optical or magnetic disks, such as a storage device which is part of mass storage. Volatile media includes dynamic memory such as RAM. Transmission media include coaxial cables, copper wire and fiber optics, including the wires that comprise a bus within a computer. Transmission media can also take the form of acoustic or light waves, such as those generated during radio wave and infra-red data communications.

Common forms of computer-readable media include, for example a magnetic medium such as a hard disk, a floppy disk, a flexible disk, a, magnetic tape, or any other magnetic medium, a CD-ROM, DVD, any other optical medium, punch cards, paper tapes, any other physical medium with patterns of holes, a RAM, a PROM, an EPROM, a FLASH-EPROM, any other memory chip or cartridge, a carrier wave as described hereafter, or any other medium from which a computer can read.

Various forms of computer readable media may be involved in carrying one or more sequences of one or more instructions to a processor for execution. For example, the instructions may initially be carried on a magnetic disk of a remote computer. The remote computer can load the instructions into its dynamic memory and send the instructions over a telephone line using a modem. A modem local to the computer system can receive the data on the telephone line and use an infrared transmitter to convert the data to an infra-red signal. An infra-red detector coupled to a bus can receive the data carried in the infra-red signal and place the data on the bus. The bus carries data to main memory, from which a processor retrieves and executes the instructions. The instructions received by main memory may optionally be stored on a storage device either before or after execution by a processor. The instructions can also be transmitted via a carrier wave in a network, such as a LAN, a WAN, or the Internet.

Various modifications are possible. The term data unit typically refers to a packet of information, i.e., to a data packet. The invention is applicable to receiving other forms of data units. The term data signal is sometimes used to indicate a data unit that may or may not be in the form of a packet, or may be several packets, or some other form, depending on the protocol of the network in which an embodiment of the invention is used.

While one definition of hearing used is successful reception of the transmission carrier and of a correct PCLP header, alternate embodiments may use other definitions. One alternate embodiment may use, for example hearing as when there is successful reception of the transmission carrier and a correct PCLP header and a correct MPDU. How to modify the embodiments described herein to accommodate such other definitions would be clear to those in the art.

While an embodiment has been described for operation according to the IEEE 802.11 standard in its various forms, the invention may be applicable to other WLAN or communication standards, including, for example, bluetooth, GSM, PHS, and other cellular wireless telephony standards, wherever hidden station detection and mitigation or avoidance is required. Other such applications include wireless Ethernet, Hiperlan I, Hiperlan II, and multimedia mobile access communication (MMAC) systems, local multipoint distribution service (LMDS) IF strips, wireless digital video, wireless USB links, wireless IEEE 1394 links, TDMA packet radios, low-cost point-to-point links, voice-over-IP portable "cell phones" (wireless Internet telephones), and so forth.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention.

What is claimed is:

1. A method of detecting a hidden node of a wireless data network wherein data is communicated in frame sequences conforming to a MAC protocol, and wherein transmitting in the network includes transmitting a transmission carrier, the method comprising:
   identifying that one or more frames that are received in a node of the network are part of a frame sequence conforming to the protocol in a node of the network; and
   determining that one or more prior frames matching the identified received frames and that belong to the same frame sequence have not been received,
wherein the receiving without previously receiving one or more prior frames automatically indicates the presence of a suspected hidden node,
the method further comprising:
   determining the identity of the suspected hidden node; and
   sending a hidden node report containing the identity of the suspected hidden node to a hidden node manager,
wherein the reporting occurs automatically and autonomously.

2. A method as recited in claim 1, wherein the reporting occurs automatically and autonomously in a controlled manner to avoid flooding.

3. A method of detecting a hidden node of a wireless data network wherein data is communicated in frame sequences conforming to a MAC protocol, and wherein transmitting in the network includes transmitting a transmission carrier, the method comprising:
   identifying that one or more frames that are received in a node of the network are part of a frame sequence conforming to the protocol in a node of the network; and
   determining that one or more prior frames matching the identified received frames and that belong to the same frame sequence have not been received,
wherein the receiving without previously receiving one or more prior frames automatically indicates the presence of a suspected hidden node, and wherein the identifying is identifying that a response frame to a response-causing frame was received, and wherein the determining is of whether the response frame was received without receiving the response-causing frame of the sequence, such that receiving the response frame without previously receiving the response-causing frame automatically indicates the presence of a hidden node.

4. A method as recited in claim 3, wherein the protocol is the IEEE 802.11 protocol, the response frame is a CTS frame, and the response-causing frame is a RTS frame.

5. A method as recited in claim 3, wherein the protocol is the IEEE 802.11 protocol, the response frame is an ACK frame, and the response-causing frame is a DATA frame.

6. A method of detecting a hidden node of a wireless data network wherein data is communicated in frame sequences conforming to a MAC protocol, and wherein transmitting in the network includes transmitting a transmission carrier, the method comprising:
   identifying that one or more frames that are received in a node of the network are part of a frame sequence conforming to the protocol in a node of the network; and
   determining that one or more prior frames matching the identified received frames and that belong to the same frame sequence have not been received,
wherein the receiving without previously receiving one or more prior frames automatically indicates the presence of a suspected hidden node, and wherein the identifying is identifying that more than one response-causing frames in sequence from the same frame exchange have been received, and wherein the determining is of whether the more than one response-causing frames were received without receiving one of the required matching response frames, such that the receiving without receiving one of the required matching response frames automatically indicates the presence of a hidden node.

7. A method of detecting a hidden node of a wireless data network wherein data is communicated in frame sequences conforming to a MAC protocol, and wherein transmitting in the network includes transmitting a transmission carrier, the method comprising:
   identifying that one or more frames that are received in a node of the network are part of a frame sequence conforming to the protocol in a node of the network; and
   determining that one or more prior frames matching the identified received frames and that belong to the same frame sequence have not been received,
wherein the receiving without previously receiving one or more prior frames automatically indicates the presence of a suspected hidden node, and wherein the identifying is identifying that a single response-causing frame has been received, and wherein the determining is determining whether the single response-causing frame was received without receiving the matching response frame, such that the receiving without receiving a matching response frame automatically suggests the possibility of the presence of a hidden node.

8. A method as recited in claim 7, wherein the protocol uses frames that include an indication of whether or not the frame is a retransmission, wherein the determining includes checking the indication of the single response-causing frame to determine if it is a retransmission, such that the receiving without receiving a matching response frame only suggests the possibility of the presence of a hidden node if the indication is that the received response-causing frame is not a retransmission.

9. A computer medium carrying computer readable code segments to instruct a processor of a processing system of a node of a wireless data network to execute a hidden node detection method, data being communicated in the wireless data network in frame sequences conforming to a MAC protocol, the computer medium comprising:
   one or more code segments to instruct the processor to identify whether one or more received frames are part of a frame sequence conforming to the protocol; and
   one or more code segments to instruct the processor to determine whether one or more prior frames that match the identified frames and that belong to the same frame sequence have also been received, such that the receiving without previously receiving the one or more matching prior frames automatically indicates the presence of a suspected hidden node,
the computer further comprising:
one or more code segments to instruct the processor to determine the identity of the suspected hidden node; and
one or more code segments to instruct the processor to send a hidden node report containing the identity of the suspected hidden node to a hidden node manager,
wherein the sending of the report occurs automatically and autonomously.

10. A computer medium as recited in claim 9, wherein the reporting occurs upon receipt of a request for a hidden node report.

11. A computer medium carrying computer readable code segments to instruct a processor of a processing system of a node of a wireless data network to execute a hidden node detection method, data being communicated in the wireless data network in frame sequences conforming to a MAC protocol, the computer medium comprising:
one or more code segments to instruct the processor to identify whether one or more received frames are part of a frame sequence conforming to the protocol; and
one or more code segments to instruct the processor to determine whether one or more prior frames that match the identified frames and that belong to the same frame sequence have also been received,
such that the receiving without previously receiving the one or more matching prior frames automatically indicates the presence of a suspected hidden node,
wherein the identifying is identifying that a response frame to a response-causing frame was received, and wherein the determining is of whether the response frame was received without receiving the response-causing frame of the sequence, such that receiving the response frame without previously receiving the response-causing frame automatically indicates the presence of a hidden node.

12. A computer medium carrying computer readable code segments to instruct a processor of a processing system of a node of a wireless data network to execute a hidden node detection method, data being communicated in the wireless data network in frame sequences conforming to a MAC protocol, the computer medium comprising:
one or more code segments to instruct the processor to identify whether one or more received frames are part of a frame sequence conforming to the protocol; and
one or more code segments to instruct the processor to determine whether one or more prior frames that match the identified frames and that belong to the same frame sequence have also been received,
such that the receiving without previously receiving the one or more matching prior frames automatically indicates the presence of a suspected hidden node,
wherein the identifying is identifying that more than one response-causing frames in sequence from the same frame exchange have been received, and wherein the determining is of whether the more than one response-causing frames were received without receiving one of the required matching response frames, such that the receiving without receiving one of the required matching response frames automatically indicates the presence of a hidden node.

13. A computer medium carrying computer readable code segments to instruct a processor of a processing system of a node of a wireless data network to execute a hidden node detection method, data being communicated in the wireless data network in frame sequences conforming to a MAC protocol, the computer medium comprising:
one or more code segments to instruct the processor to identify whether one or more received frames are part of a frame sequence conforming to the protocol; and
one or more code segments to instruct the processor to determine whether one or more prior frames that match the identified frames and that belong to the same frame sequence have also been received,
such that the receiving without previously receiving the one or more matching prior frames automatically indicates the presence of a suspected hidden node,
wherein the identifying is identifying that a single response-causing frame has been received, and wherein the determining is determining whether the single response-causing frame was received without receiving the matching response frame, such that the receiving without receiving a matching response frame automatically suggests the possibility of the presence of a hidden node.

14. A method of managing hidden nodes in a wireless data network wherein data is communicated in frame sequences conforming to a MAC protocol, the method comprising:
receiving a hidden node report from a hidden node detector in the network identifying one or more suspected hidden nodes; and
automatically mitigating or avoiding interference that may be caused by the suspected hidden nodes by sending out one or more action messages,
wherein the hidden node detector automatically detects a suspected hidden node by identifying that one or more frames that are received in the node of the detector are part of a frame sequence conforming to the protocol in a node of the network; and determining that one or more prior frames matching the identified received frames and that belong to the same frame sequence have not been received,
wherein the mitigating or avoiding automatically sends out an action message to each suspected hidden node in order to avoid any interference that may be caused by the suspected hidden node, and
wherein the action message is to change the transmission power used by the suspected hidden node.

15. A method of managing hidden nodes in a wireless data network wherein data is communicated in frame sequences conforming to a MAC protocol, the method comprising:
receiving a hidden node report from a hidden node detector in the network identifying one or more suspected hidden nodes; and
automatically mitigating or avoiding interference that may be caused by the suspected hidden nodes by sending out one or more action messages,
wherein the hidden node detector automatically detects a suspected hidden node by identifying that one or more frames that are received in the node of the detector are part of a frame sequence conforming to the protocol in a node of the network; and determining that one or more prior frames matching the identified received frames and that belong to the same frame sequence have not been received,
wherein the mitigating or avoiding automatically sends out an action message to each suspected hidden node in order to avoid any interference that may be caused by the suspected hidden node, and
wherein the action message is to increase the transmission power used by the suspected hidden node.

16. A method of managing hidden nodes in a wireless data network wherein data is communicated in frame sequences conforming to a MAC protocol, the method comprising:

receiving a hidden node report from a hidden node detector in the network identifying one or more suspected hidden nodes; and automatically mitigating or avoiding interference that may be caused by the suspected hidden nodes by sending out one or more action messages, wherein the hidden node detector automatically detects a suspected hidden node by identifying that one or more frames that are received in the node of the detector are part of a frame sequence conforming to the protocol in a node of the network; and determining that one or more prior frames matching the identified received frames and that belong to the same frame sequence have not been received, wherein the mitigating or avoiding automatically sends out an action message to each suspected hidden node in order to avoid any interference that may be caused by the suspected hidden node, and wherein the method is implemented at a single entity for managing all nodes of the network, wherein a first suspected hidden node is in a different basic service set than the basic service set of the node of the hidden node detector, and wherein the action message is the first suspected hidden node is to lower the transmission power used by the first suspected hidden node.

17. A method of managing hidden nodes in a wireless data network wherein data is communicated in frame sequences conforming to a MAC protocol, the method comprising:

receiving a hidden node report from a hidden node detector in the network identifying one or more suspected hidden nodes; and automatically mitigating or avoiding interference that may be caused by the suspected hidden nodes by sending out one or more action messages, wherein the hidden node detector automatically detects a suspected hidden node by identifying that one or more frames that are received in the node of the detector are part of a frame sequence conforming to the protocol in a node of the network; and determining that one or more prior frames matching the identified received frames and that belong to the same frame sequence have not been received, wherein the mitigating or avoiding automatically sends out an action message to each suspected hidden node in order to avoid any interference that may be caused by the suspected hidden node, and wherein the action message is to change the channel used by the suspected hidden nodes.

* * * * *

UNITED STATES PATENT AND TRADEMARK OFFICE
CERTIFICATE OF CORRECTION

| | | |
|---|---|---|
| PATENT NO. | : 7,184,407 B1 | Page 1 of 1 |
| APPLICATION NO. | : 10/142538 | |
| DATED | : February 27, 2007 | |
| INVENTOR(S) | : Myles et al. | |

It is certified that error appears in the above-identified patent and that said Letters Patent is hereby corrected as shown below:

Title Page
Item (54) and Column 1, lines 1-3
Kindly change the title from "DETECTING, REPORTING AND MITIGATING HIDDEN NODES IN A WIRELESS DATA NETWORK" to --DETECTING, REPORTING AND MITIGATING HIDDEN STATIONS IN A WIRELESS DATA NETWORK--.

Signed and Sealed this

Tenth Day of April, 2007

JON W. DUDAS
*Director of the United States Patent and Trademark Office*